US008075066B2

(12) United States Patent
Greer

(10) Patent No.: US 8,075,066 B2
(45) Date of Patent: Dec. 13, 2011

(54) METERING CHECK VALVE FOR ACTIVE BRAKE PADS RETRACTION SYSTEM

(75) Inventor: Jeff Greer, Newcastle (CA)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 12/416,985

(22) Filed: Apr. 2, 2009

(65) Prior Publication Data

US 2010/0253136 A1 Oct. 7, 2010

(51) Int. Cl.
*B60T 15/46* (2006.01)
(52) U.S. Cl. ............... 303/84.2; 303/157; 188/72.3
(58) Field of Classification Search ............ 303/84.2, 303/3, 11, 155, 157, 158; 188/72.3, 72.4
See application file for complete search history.

(56) References Cited

U.S. PATENT DOCUMENTS

| | | |
|---|---|---|
| 3,524,684 A | 8/1970 | Skoyles |
| 3,724,914 A | 4/1973 | Skoyles |
| 3,756,666 A | 9/1973 | Leiber |
| 3,871,717 A * | 3/1975 | Jensen ............... 303/122.13 |
| 4,214,921 A | 7/1980 | Henderson |
| 4,340,258 A | 7/1982 | Farr |
| 4,375,842 A | 3/1983 | Melinat |
| 4,401,348 A | 8/1983 | Farr |
| 4,556,261 A | 12/1985 | Farr |
| 4,655,509 A | 4/1987 | Ando et al. |
| 4,668,023 A | 5/1987 | Every et al. |
| 4,673,226 A | 6/1987 | Every et al. |
| 4,685,749 A | 8/1987 | Otsuki et al. |
| 4,699,436 A | 10/1987 | Klein |
| 4,730,879 A | 3/1988 | Adachi et al. |
| 4,755,008 A | 7/1988 | Imoto et al. |
| 4,768,843 A | 9/1988 | Baughman et al. |
| 4,772,075 A | 9/1988 | Wupper et al. |
| 4,790,607 A | 12/1988 | Atkins |
| 4,808,275 A | 2/1989 | Ohzora et al. |
| 4,826,256 A | 5/1989 | Von Hayn et al. |
| 5,067,778 A | 11/1991 | Testardi |
| 5,149,178 A | 9/1992 | Saito et al. |
| 5,152,586 A | 10/1992 | Burgdorf |
| 5,152,589 A | 10/1992 | Ocvirk |
| 5,167,441 A | 12/1992 | Schonlau et al. |
| 5,176,432 A | 1/1993 | Burgdorf et al. |
| 5,180,211 A | 1/1993 | Weise et al. |
| 5,186,524 A | 2/1993 | Burgdorf et al. |
| 5,195,809 A | 3/1993 | Burgdorf |

(Continued)

OTHER PUBLICATIONS

Society of Automotive Engineers (SAE) Surface Vehicle Information Report, SAE J2564, "Automotive Stability Enhancement Systems", revised Jun. 2004 and superceding version issued Dec. 2000.

(Continued)

*Primary Examiner* — Pamela Rodriguez

(57) ABSTRACT

In an active brake pads retraction system, the improvement is a metering check valve which limits the retraction. The metering check valve is interfaced with an anti-lock brake system (ABS), disposed in the hydraulic brake line between the brakes apply system of the ABS and a caliper member of the ABS located at each brake corner. Brake pads are retracted with respect to the brake rotor responsive to predetermined conditions of the motor vehicle in which braking is not required, wherein a retraction volume within the metering check valve limits the amount of brake pads retraction.

11 Claims, 4 Drawing Sheets

U.S. PATENT DOCUMENTS

| | | |
|---|---|---|
| 5,195,810 A | 3/1993 | Ocvirk et al. |
| 5,195,811 A | 3/1993 | Buschmann et al. |
| 5,197,788 A | 3/1993 | Fennel et al. |
| 5,346,292 A | 9/1994 | Hall |
| 5,511,638 A | 4/1996 | Tsuruta |
| 5,743,600 A * | 4/1998 | Yasuda et al. .............. 303/116.1 |
| 5,788,340 A | 8/1998 | Kobayashi |
| 6,241,326 B1 | 6/2001 | Ferguson et al. |
| 6,286,635 B1 | 9/2001 | Tamor |
| 6,386,342 B1 | 5/2002 | Tsuge et al. |
| 6,679,356 B2 | 1/2004 | Hageman et al. |
| 6,896,338 B2 | 5/2005 | Nakayasu et al. |
| 2008/0265663 A1 | 10/2008 | Leach et al. |

OTHER PUBLICATIONS

U.S. Appl. No. 11/739,721, filed Apr. 25, 2007 to Leach, et al, entitled "Active Brake Pads Retraction System and Method".

* cited by examiner

METERING CHECK VALVE FOR ACTIVE BRAKE PADS RETRACTION SYSTEM

TECHNICAL FIELD

The present invention relates to braking systems used in motor vehicles. More particularly, the present invention relates to a system for actively retracting brake pads from brake rotors during predetermined conditions of the motor vehicle. Still more particularly, the present invention relates to a metering check valve incorporated into an active brake pads retraction system which provides positive limitation of brake pad retraction.

BACKGROUND OF THE INVENTION

Motor vehicle disk brake systems utilize, at each wheel, a brake rotor connected to an axle hub of a rotatable axle of the motor vehicle, and an opposing set of selectively movable brake pads connected to a non-rotating brake caliper which carries a set of brake pads. The brake rotor includes a disk shaped rotor cheek having opposing brake pad engagement surfaces, wherein when braking is to occur, the braking system causes the caliper to press the brake pads upon respective brake pad engagement surfaces of the rotor cheek. Frictional interaction between the rotating rotor cheek and non-rotating brake pads causes braking of the motor vehicle to transpire, the rate of braking depending upon the pressure of the brake pads against the rotor cheek.

In the automotive art, modern dual-circuit hydraulic braking systems for automotive applications typically include an operator-actuated brake actuation unit, such as a tandem master cylinder actuated by a booster-aided brake pedal, by which to supply a first pressurized brake fluid to each of a first pair of wheel brakes via a first or "primary" braking circuit, and a second pressurized brake fluid to each of a second pair of wheel brakes via a second or "secondary" braking circuit. The use of wholly redundant braking circuits for operating discrete pairs of wheel brakes ensures continued vehicle braking capability, notwithstanding a degradation of performance of one of the braking circuits.

In order to achieve an "anti-lock" braking system (ABS), each braking circuit often features a normally-open electrically-operated inlet valve controlling the flow of pressurized fluid to each wheel brake, while a pressure relief line that includes a normally-closed electrically-operated outlet valve, a return pump, and a check valve controls the return of pressurized fluid from the wheel brake to the hydraulic brake line upstream of the inlet valve. A "separation" or "isolation" valve, located in the hydraulic brake line of each circuit upstream of the location at which the pressure relief line connects to the brake line, serves to isolate the brake line from the master cylinder during anti-lock operation.

Increasingly, such anti-lock braking systems are used in combination with wheel speed sensors in a traction control mode. The further addition of a steering angle sensor, a vehicle yaw rate sensor, and a lateral vehicle acceleration sensor in conjunction with vehicle speed, wheel speed, and wheel longitudinal slip enables such anti-lock braking systems to operate in an "electronic stability control" mode, wherein a braking system electronic control unit (ECU) selectively energizes each circuit's electrically-operated valves when the controller identifies an opportunity to enhance vehicle stability through a selective application of the vehicle's brakes.

In order to control the brake fluid pressure in traction control or vehicle stability control modes, a hydraulic pump is typically placed in the pressure relief line of each circuit downstream of the outlet valve to return pressurized fluid to the circuit's hydraulic brake line. The pump also serves to provide an increasing rate of fluid pressure upon the closing of the isolation valve to provide a sufficient braking system response time when operating in a traction control mode, even at a time when the brake fluid has a relatively-high viscosity due, for example, to low brake fluid temperatures.

The prior art has recognized, however, that a quicker system response is desirable when the braking system is operated in a vehicle stability control mode. By way of example, a rapid pressure build up in one or the other braking circuit is particularly desirable upon commencing vehicle stability control in order to correct oversteer or understeer conditions. Accordingly, the prior art teaches the addition of a braking circuit pre-charging function to the brake actuation unit, i.e., to the vacuum booster of the master cylinder, in order to increase system response at the time such vehicle stability control is commenced. Alternatively, an additional pre-charging pump is provided in one or both braking circuits to ensure a sufficient increasing rate of fluid pressure at the commencement of vehicle stability control enhancement.

There are multiple Electronic Stability Control (ESC) system implementations on the road today. Although all of them attempt to perform the same task of helping the driver retain reasonable directional control under nonlinear vehicle dynamic conditions, these ESC systems have some distinct implementation differences and can be divided into four categories as defined and described in The Society of Automotive Engineers (SAE) Surface Vehicle Information Report, SAE J2564, "Automotive Stability Enhancement Systems", revised June, 2004 and superceding version issued December, 2000.

Elements that ESC systems have in common include ABS and the ability to sense steering wheel position; the ability to calculate vehicle speed; the ability to sense yaw velocity and lateral acceleration; and the ability to build and control braking force in the channels used for yaw stability control independent of the driver's input to the vehicle braking system. An example of the implementation of a vehicle hydraulic braking system utilizing an ESC system is described in U.S. Pat. No. 6,896,338 B2 to Nakayasu et al., which patent is hereby incorporated herein by reference in its entirety.

Referring now to FIGS. 1A and 1B, the structural and operational aspects of a prior art anti-lock braking system (ABS) will be described, keeping the description limited to those portions thereof having relevance to the present invention.

An ABS 10 includes an electronic control unit (ECU) 12 which is electronically interfaced with a brake pedal assembly 14, at least one hydraulic brake fluid pump 16, and at each wheel with an inlet valve 18, and an outlet valve 20. An hydraulic brake line 22 is interfaced with the brake fluid pump and the inlet and outlet valves at each wheel, and is further interfaced with a master cylinder brake fluid reservoir 24, and still further interfaced at each brake corner (i.e., at each vehicle wheel) with caliper actuators 26 (consisting of one or more cylinders 26a and pistons 26b). A brake caliper 28 is non-rotatively affixed at each wheel in straddling relation to the brake rotor 30 of the respective brake corner (which is, in turn, connected in fixed relation to the rotative wheel axle (not shown). In a braking system utilizing a sliding brake caliper (as is shown in FIGS. 1A and 1B), one side 28a of the brake caliper is hydraulically active and the other side 28b hydraulically inactive. In a braking system utilizing a fixed brake caliper, both sides of the brake caliper are hydraulically active. In either case, a brake pad 32a, 32b is respectively affixed at both sides of the brake caliper, so that when the hydraulic brake fluid in the caliper portion 22a of the brake line 22 is pressurized, the brake caliper causes the brake pads to squeeze upon the cheeks 30a of the brake rotor 30.

In operation, the ECU constantly runs predetermined algorithms while receiving vehicular behavior inputs (via sensors) to determine brake action commands. In FIG. 1A, a brake apply situation is occurring. The ECU has commanded the inlet valve be open, the outlet valve be closed and the brake fluid pump to rapidly energize so as to provide a high pressure HP brake fluid in the caliper portion of the brake line, thereby applying the brakes in the sense that the brake pads press hard against the rotor cheeks. The normally open inlet valve and normally closed outlet valve are such during normal braking, being selectively opened and closed by the ECU during an ABS event, as for example when slip at the wheels is occurring. In FIG. 1B, a no brake apply situation is occurring. The ECU has commanded the inlet valve to remain open, the outlet valve to remain closed and the brake fluid pump to de-energize so as to provide a low pressure LP brake fluid in the caliper portion of the hydraulic brake line, thereby releasing the brakes in the sense that the brake pads no longer press hard against the rotor cheeks.

The focus of current braking system design is on rapid response to reduce vehicle stopping distance and on high pressure sealing to ensure hydraulic brake system integrity. These design targets typically require a sealing implementation in which the brake pads are unable to actively retract from the brake rotor after brake application, since the response of the braking system is optimized for quick response and high sealing ability.

In this regard, the application of the brake pads to the rotor flexes the seals of the hydraulic braking system. Since the braking system is designed for quick response and sealing of high hydraulic pressures, the seals do not fully return the braking system back to zero pressure, and the brake pads remain in adjacency with the brake rotor cheeks even when the brake pedal is not pressed by the vehicle operator. Thus, the brake pad material is kept in close contact to the rotor cheeks in all conditions of the motor vehicle.

This close contact of the brake pads with the brake rotor during brake rotor rotation creates a frictional force due to the residual force of the seal (from the last brake application) which, in turn, creates a torque in the opposite direction of vehicle's forward rotation. This torque, termed drag torque, reduces the efficiency of the vehicle's propulsion system and thereby increases fuel consumption. When the vehicle is parked, this same residual force from the seals keeps the brake pad material in contact with the brake rotor cheeks. When these components, which are typically manufactured with a percentage of metal, are exposed to moisture, they can corrode via galvanic action. This galvanic action creates inconsistencies on the rotor cheeks and brake pad surfaces locally on the section of the brake rotor where these components were in mutual contact. These surface inconsistencies create a local rotor cheek thickness and surface material property mix different than the rest of the rotor cheeks. This physically unique section of the brake rotor creates a different frictional force compared to the rest of the brake rotor during rotation when the brakes are applied. This varying frictional force creates a periodically varying frictional torque, the period coinciding with the rate of rotation. This variable torque excites the brake caliper which, in turn, excites the suspension components of the vehicle, and this resultant vibration is sensed by the vehicle's operator through the steering wheel and the body, and is also sensed as pulsation of the brake pedal. The vehicle operator can perceive this condition as annoying and may seek early brake servicing.

The aforesaid problems associated with current brake pads retraction modalities were solved by an active brake pads retraction system and method disclosed in U.S. patent application Ser. No. 11/739,721, filed Apr. 25, 2007 to inventors Leach, et al. and assigned to the assignee hereof, which application was published as U.S. Patent Application Publication 2008/0265663 A1 on Oct. 30, 2008, the disclosure of this patent application and patent publication being hereby incorporated herein by reference in entirety (hereinafter referred to as the "GM Active Brake Pads Retraction System".

The GM Active Brake Pads Retraction System discloses an active brake pads retraction system which retracts the brake pads with respect to the brake rotor responsive to predetermined conditions of the motor vehicle in which braking is not required. To accomplish this benefit, the GM Active Brake Pads Retraction System teaches selective application of negative hydraulic brake line pressure to cause the caliper pistons to retract with respect to their respective caliper cylinders, thereby causing the brake pads to retract from the brake rotor (i.e., the brake pads are affirmatively relocated by the brake line vacuum differential pressure with respect to atmospheric into a spaced relation with respect to the rotor cheeks.

According to the GM Active Brake Pads Retraction System, the electronic and hydraulic brake control system of current anti-lock brake systems (ABS) are utilized, wherein these control systems are uniquely configured to provide active retraction of the brake pads from the brake rotor during predetermined conditions of the motor vehicle when braking is not required, as for example when the motor vehicle is cruising or parked.

In operation of the GM Active Brake Pads Retraction System, the electronic control unit (ECU) of the ABS constantly runs algorithms, including an active brake pad retraction algorithm, while receiving vehicular behavior inputs to determine brake action commands. Upon command from the ECU to execute active brake pads retraction, the normally open inlet valve of the hydraulic brake line is closed and the normally closed outlet valve of the brake line is opened. These valve settings isolate the caliper portion of the brake line from the pressure side, and simultaneously expose it to the vacuum side, of the hydraulic brake fluid pump. The brake fluid pump is thereupon immediately energized, pushing the hydraulic brake fluid in the brake line upstream of the brake fluid pump towards the master cylinder reservoir, which is vented to atmosphere. The brake line downstream of the brake fluid pump is therefore exposed to a negative (i.e., below atmospheric) brake line pressure. This negative pressure with respect to atmospheric pressure applies a suction-retraction force to the caliper portion of the brake line. This pressure differential is registered at the caliper pistons, which are caused to be pulled in the direction of the negative pressure to compensate for the displacement of the brake fluid pumped into the master cylinder brake fluid reservoir on the pressure side of the brake fluid pump. This displacement of the caliper pistons actively moves the brake pads, which are affixed to the pistons, as for example via brake pad clips known in the art, away from the rotor cheek surfaces.

According to the GM Active Brake Pads Retraction System, in a braking system utilizing a sliding brake caliper, one side of the brake caliper is hydraulically active and the other side is hydraulically inactive, wherein the hydraulically active side brake pad tends to retract first until the brake caliper reacts to allow the hydraulically inactive side brake pad to also retract. Further according to the GM Active Brake Pads Retraction System, in a braking system utilizing a fixed brake caliper, both sides of the brake caliper are hydraulically active and the caliper pistons retract independently of each other as both are directly affected by the negative pressure in the caliper portion of the brake line. Finally according to the GM Active Brake Pads Retraction System, in either type of brake caliper, brake pad retraction creates a gap between the brake pads and the brake rotor, thereby reducing parasitic brake drag and galvanic corrosion.

While the GM Active Brake Pads Retraction System solves the problems associated with current brake pads retraction modalities, what remains needed is some way to positively limit the maximum retraction distance of the brake pads with respect to the rotor cheeks.

SUMMARY OF THE INVENTION

The present invention is a metering check valve which positively defines the limit of retraction distance of the brake pads with respect to the rotor cheeks in an active brake pads retraction system, as for example the system disclosed in the aforementioned GM Active Brake Pads Retraction System, to wit: said U.S. patent application Ser. No. 11/739,721 and U.S. Patent Application Publication 2008/0265663 A1. In this regard, the metering check valve of the present invention is interfaced with an anti-lock brake system (ABS) which includes an active brake pads retraction system, and is disposed in the hydraulic brake line between the brakes apply system of the ABS and a caliper member of the ABS located at each brake corner.

The metering check valve according to the present invention includes a valve body having formed therewithin a valve cylinder and a communicating valve chamber, wherein the hydraulic brake line is connected to an inlet of the valve body at the valve cylinder and to an outlet of the valve body at the valve chamber. The metering check valve further includes a valve piston having an internal passage characterized by an axial passage and a communicating radial passage. The valve piston is sealingly interfaced with the cylinder wall of the valve cylinder, and is free to slide in the valve cylinder, being oriented so that the axial passage faces toward the inlet, wherein the valve piston sliding is limited at the valve chamber by compression of a valve spring and limited at the valve cylinder by abutment with an end shoulder of the valve body. The uncompressed state of the valve spring defines a spring neutral position of the valve piston whereat the valve piston is disposed remote from the end shoulder, yet the radial passage is sealed closed by the cylinder wall.

In operation of the metering check valve in an active brake pads retraction system according to the GM Active Brake Pads Retraction System, the electronic control unit (ECU) of the ABS constantly runs algorithms, including an active brake pad retraction algorithm, while receiving vehicular behavior inputs to determine brake action commands.

When the operator of the motor vehicle applies the brake pedal, the ECU commands the inlet valve be open, the outlet valve be closed and the brake fluid pump to rapidly energize so as to provide a high pressure brake fluid in the valve cylinder, pushing the valve piston and providing high pressure to the caliper portion of the brake line, thereby applying the brakes in the sense that the brake pads press hard against the rotor cheeks. In this regard with respect to the metering check valve of the present invention, the valve piston moves into the valve chamber and the radial passage opens thereinto, whereby unlimited hydraulic brake fluid is available to the caliper pistons to ensure compliance with any level of braking requested. The normally open inlet valve and normally closed outlet valve are such during normal braking, being selectively opened and closed by the ECU during an ABS event, as for example when slip at the wheels is occurring.

When the operator of the motor vehicle releases the brake pedal, upon command from the ECU to execute active brake pad retraction, the normally open inlet valve of the hydraulic brake line is closed and the normally closed outlet valve of the brake line is opened. These valve settings isolate the caliper portion of the brake line from the pressure side, and simultaneously expose it to the vacuum side, of the hydraulic brake fluid pump. The brake fluid pump is thereupon immediately energized, pushing the hydraulic brake fluid in the brake line upstream of the brake fluid pump towards the master cylinder reservoir, which is vented to atmosphere. The brake line downstream of the brake fluid pump is therefore exposed to a negative (i.e., below atmospheric) brake line pressure. This negative pressure with respect to atmospheric pressure applies a suction-retraction force to the valve piston of the metering check valve of the present invention, which suction-retraction is assisted by the biasing of the valve piston to the spring neutral position by the valve spring such that the radial passages are sealed closed by the cylinder wall, thereby causing the valve piston to move toward the inlet, i.e., toward the end shoulder of the valve body. Simultaneously, hydraulic fluid from the caliper portion of the brake line is drawn, via the outlet, into the valve chamber and communicating valve cylinder as the valve piston moves. This creates a pressure differential that is registered at the caliper pistons which causes them to be pulled in the direction of the negative pressure to compensate for the displacement of the brake fluid pumped into the master cylinder brake fluid reservoir on the pressure side of the brake fluid pump. This displacement of the caliper pistons actively moves the brake pads, which are affixed to the pistons, as for example via brake pad clips known in the art, away from the rotor cheek surfaces. The retraction movement of the brake pads is limited to the retraction volume of hydraulic fluid displaced by the movement of valve piston in the valve body of the metering check valve.

Accordingly, it is an object of the present invention to provide a metering check valve for an active brake pad retraction system which positively limits the extent of brake pads retraction.

This and additional objects, features and advantages of the present invention will become clearer from the following specification of a preferred embodiment.

DESCRIPTION OF THE PREFERRED EMBODIMENT

Figure 1A:
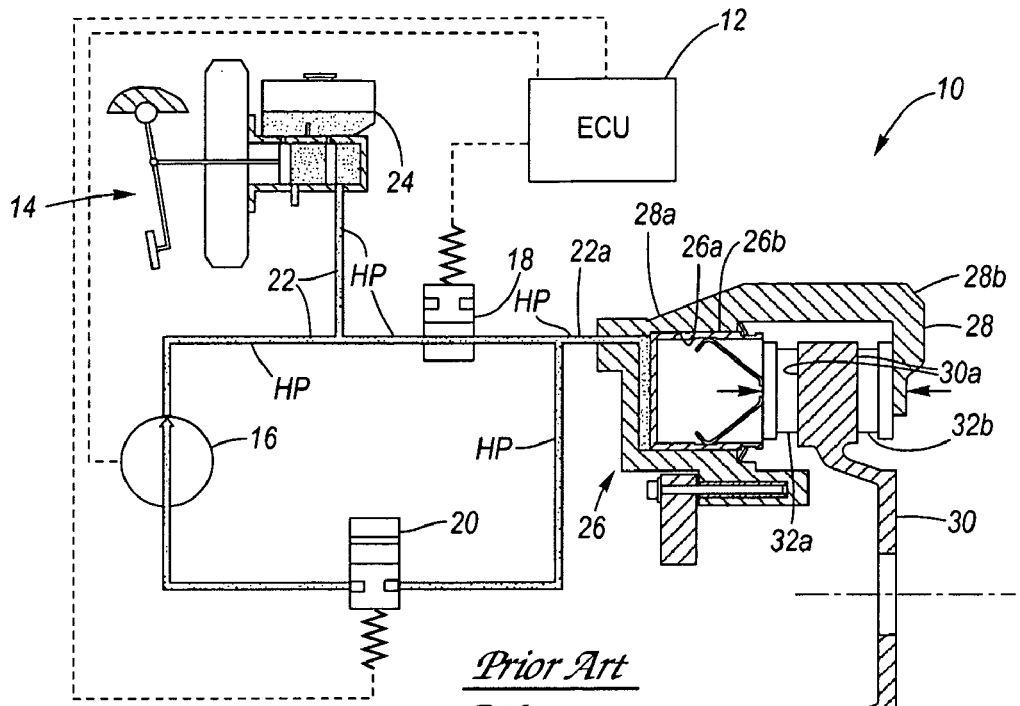
FIG. 1A is a schematic depiction of a prior art anti-lock brake system (ABS), depicting a brakes applied situation, wherein the electronics and hydraulics for one brake corner are depicted.

Referring now to the Drawing, FIGS. 2 through 7B depict an active brake pads retraction system, by way of example being the aforementioned GM Active Brake Pads Retraction System, having an integrated metering check valve according to the present invention.

Figure 1B:
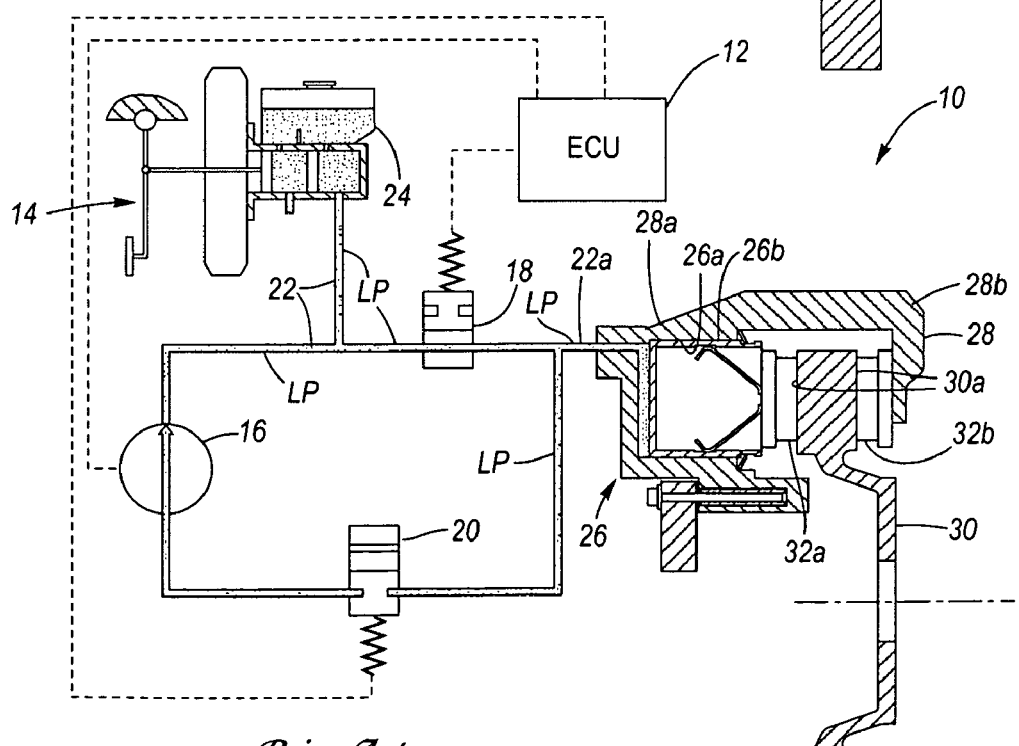
FIG. 1B is a schematic depiction of the prior art ABS of FIG. 1A, now depicting a brakes un-applied situation.
Figure 2:
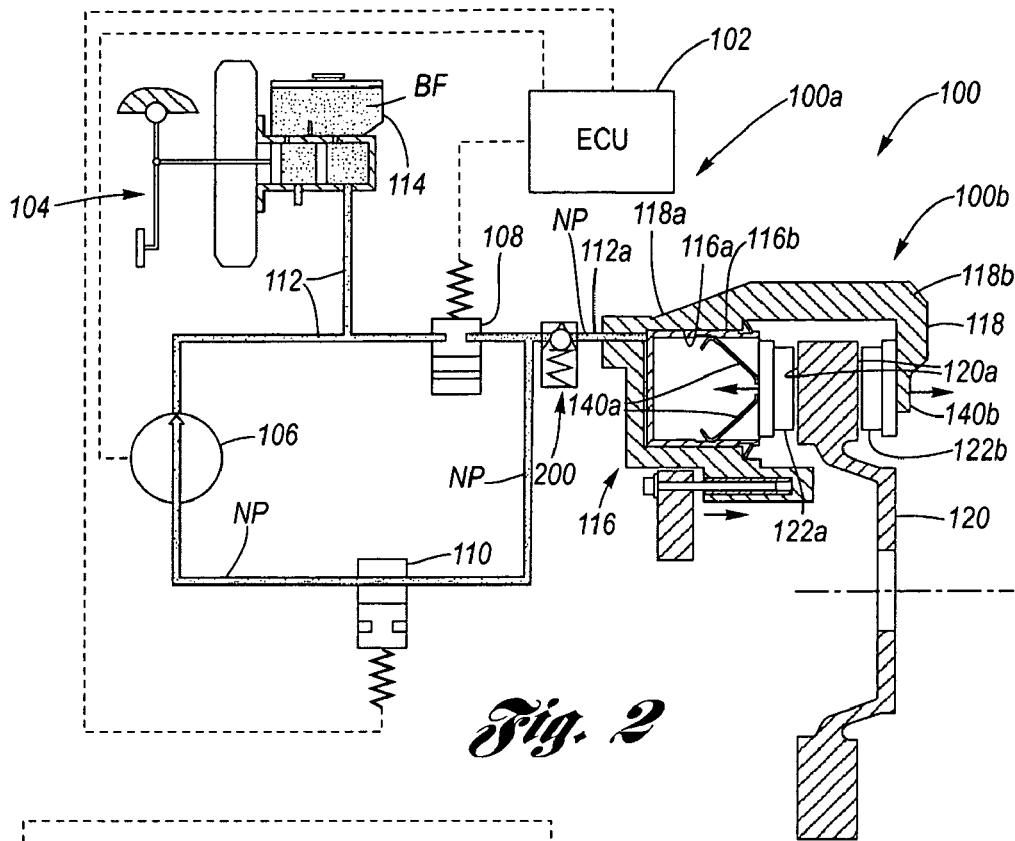
FIG. 2 is a schematic depiction of an ABS incorporating an active brake pad retraction system including a metering check valve according to the present invention, depicting a brakes un-applied situation in which an active brake pad retraction algorithm according to the present invention is implemented, wherein a sliding brake caliper is shown and wherein the hydraulics and electronics are with respect to one brake corner.
Figure 3:
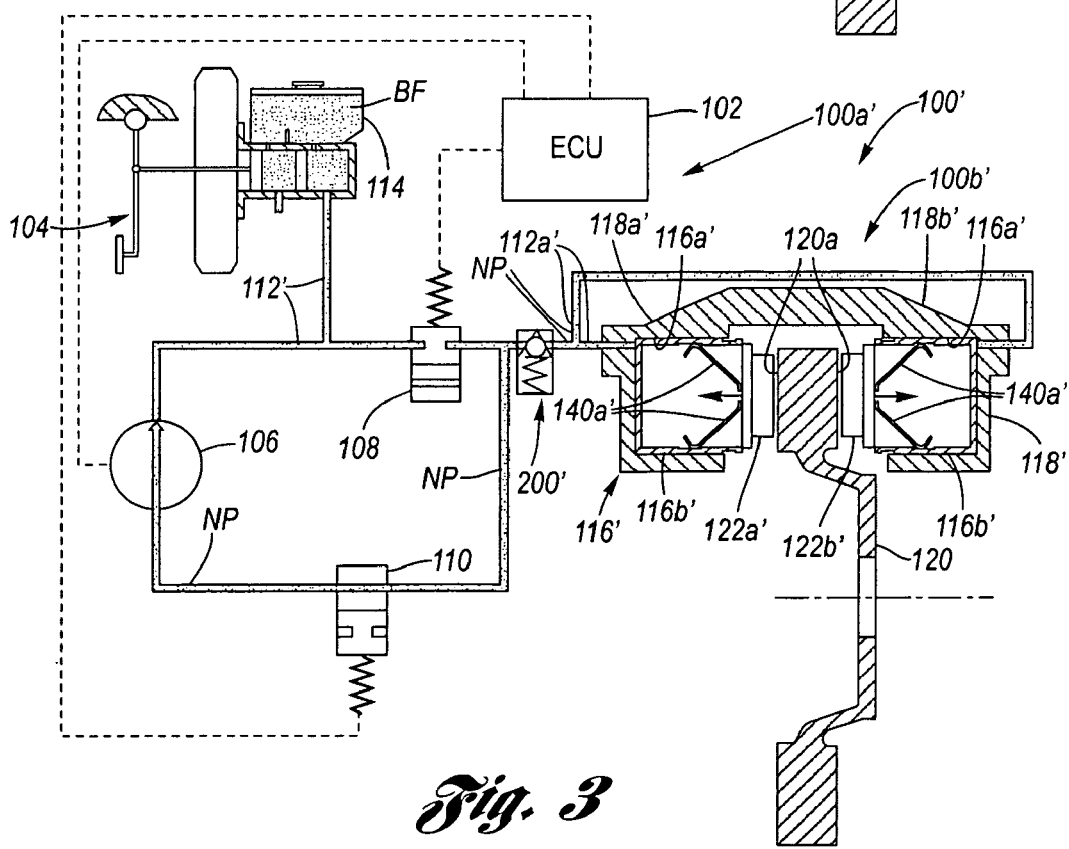
FIG. 3 is a schematic depiction of an ABS incorporating an active brake pad retraction system including a metering check valve according to the present invention depicting a brakes un-applied situation in which the active brake pad retraction algorithm according to the present invention is implemented, wherein a fixed brake caliper is shown and wherein the hydraulics and electronics are with respect to one brake corner.

Referring firstly to FIGS. 2 and 3, an anti-lock brake system (ABS) 100, 100' is generally similar to that referred to in FIGS. 1A and 1B, and includes a brakes apply system 100a, 100a' of the ABS and a caliper member 100b, 100b' of the ABS located at each brake corner.

The brakes apply system 100a, 100a' includes a brake actuation electronic control unit (ECU) 102 which is electronically interfaced with a brake pedal assembly 104, at least one hydraulic brake fluid pump 106 of hydraulic brake fluid BF (i.e., there may be one pump or there may be, for example, two pumps, one for each brake circuit of the brake line), and at each brake corner with an inlet valve 108, and an outlet valve 110. An hydraulic brake line 112, 112' is interfaced with the at least one brake fluid pump and the inlet and outlet valves at each wheel, and is further interfaced with a master cylinder brake fluid reservoir 114. The brakes apply system 100a, 100a' is connected to the caliper member 100b, 100b' at each brake corner via the metering check valve 200, 200' according to the present invention. In this regard, the hydraulic brake line 112, 112' connects to an inlet side of the metering check valve 200, 200' and a brake line caliper portion 112a, 112a' connects to an outlet side of the metering check valve. The brake line caliper portion 112a, 112a', in turn, connects to the caliper actuator 116, 116' (consisting of one or more cylinders 116a, 116a' and pistons 116b, 116b'). A brake caliper 118, 118' is non-rotatively affixed at each brake corner (i.e., at each wheel) in straddling relation to the brake rotor 120 of the respective brake corner (which is, in turn, connected in fixed relation to the rotative wheel axle (not shown).

In a braking system 100 utilizing a sliding caliper 118 as is shown in FIG. 2, one side 118a of the caliper housing is hydraulically active and the other side 118b hydraulically inactive. In a braking system 100' utilizing a fixed caliper 118' as is shown at FIG. 3, both sides 118a', 118b' of the caliper housing are hydraulically active. With respect to application of the brakes, for either type of brake caliper 118, 118', a brake pad 122a, 122a', 122b, 122b' is respectively affixed at both sides of the brake caliper, so that when the hydraulic brake fluid in the caliper portion 112a, 112a' of the brake line is pressurized, the brake caliper causes the brake pads to squeeze upon the cheeks 120a of the brake rotor 120.

Figure 4:
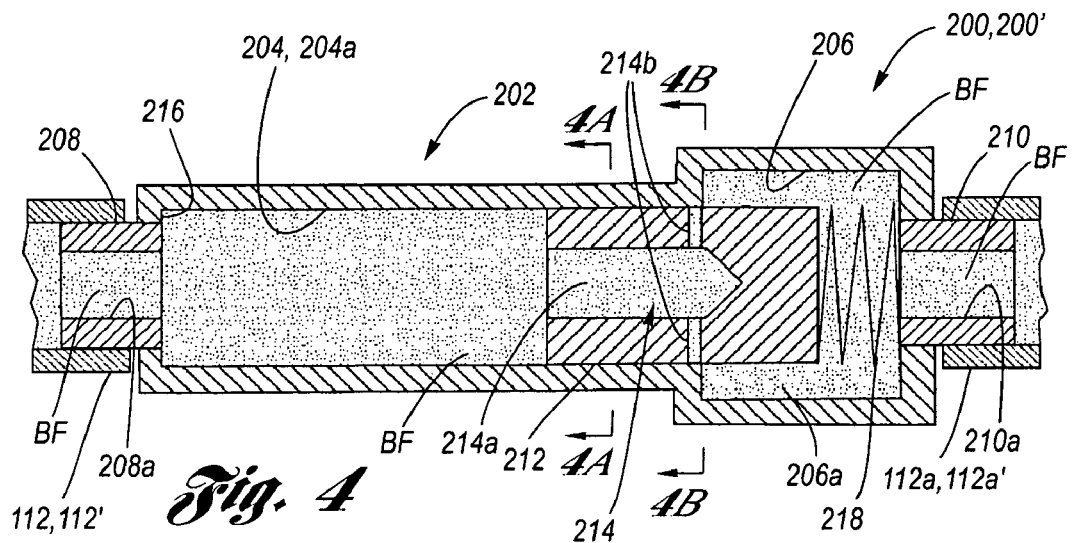
FIG. 4 is a sectional side view of the metering check valve according to the present invention, shown in operation where the valve piston is at a spring neutral position.
Figure 4A:
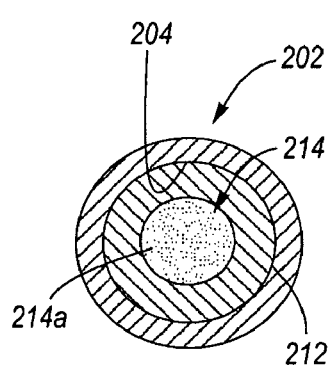
FIG. 4A is a sectional view seen along line 4A-4A of FIG. 4.
Figure 4B:
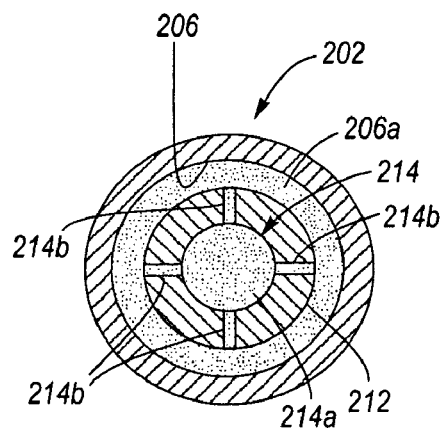
FIG. 4B is a sectional view seen along line 4B-4B of FIG. 4.
Figure 5:
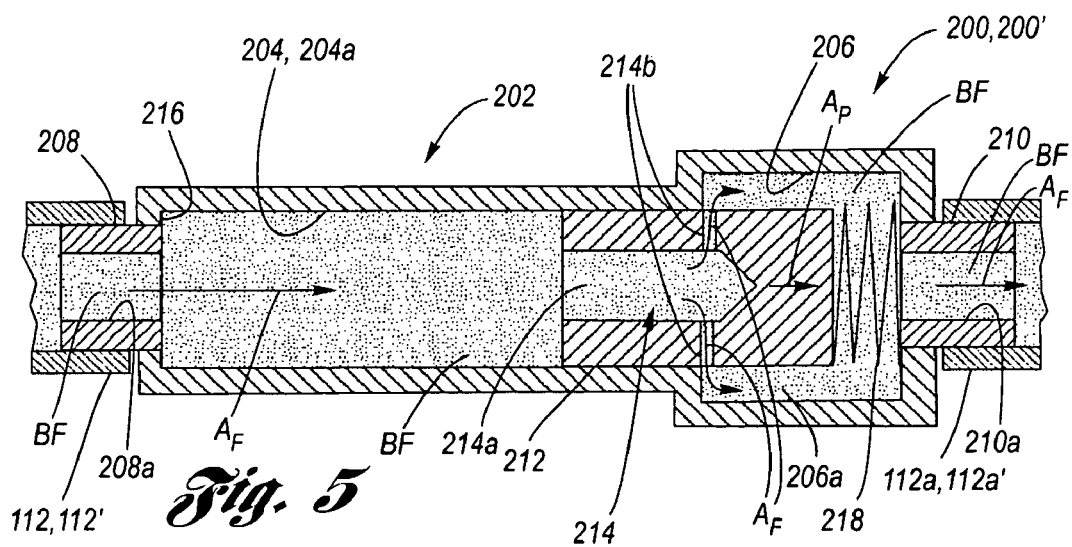
FIG. 5 is a sectional side view of the metering check valve according to the present invention, shown in operation during a brakes applied situation.
Figure 6:
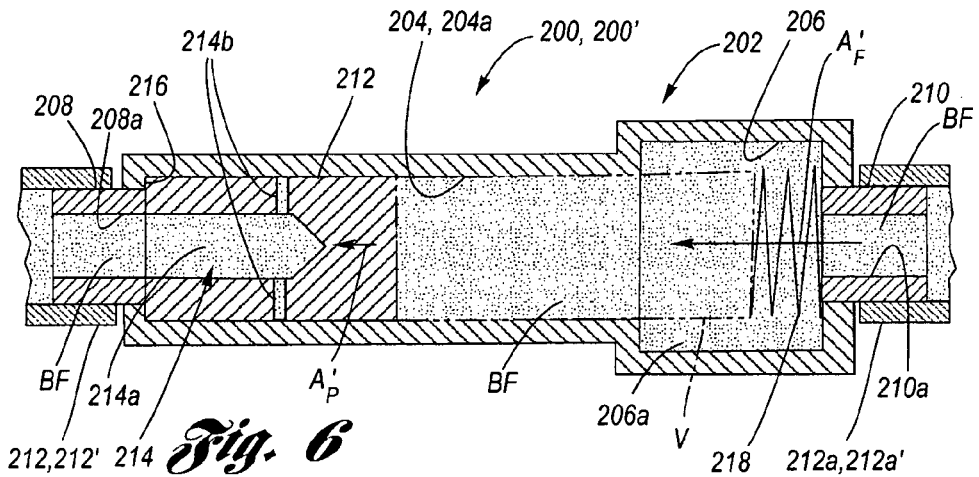
FIG. 6 is a sectional side view of the metering check valve of FIG. 4, now shown in a brakes un-applied situation in which the active brake pads retraction system has retracted the brake pads, and the metering check valve has limited the retraction.

An example of a structure and function of the metering check valve 200, 200' can be understood by reference to FIGS. 4 through 6.

The metering check valve 200, 200' has a valve body 202. Formed within the valve body 202 is an elongated valve cylinder 204 and a communicating valve chamber 206, wherein the valve chamber includes an internal space 206a which has a diameter exceeding the diameter of the cylinder wall 204a of the valve cylinder. An inlet fitting 208 is connected with the valve body 202, such that an inlet port 208a thereof communicates with the valve cylinder 204. An outlet fitting 210 is connected with the valve body 202, such that an outlet port 210a thereof communicates with the valve chamber 206. The hydraulic brake line 112, 112' is connected, as for nonlimiting example by a threaded or pressed interface, to the inlet fitting 208, and the brake line caliper portion 112a, 112a' is connected, as for nonlimiting example by a threaded or pressed interface, to the outlet fitting 210.

A valve piston 212 is freely slidable within, and sealed with respect to, the cylinder wall 204a of the valve cylinder 204. The valve piston 212 has an internal passage 214 characterized by an axial passage 214a and at least one (four being showed by example) communicating radial passage 214b, wherein the valve piston is oriented in the valve cylinder 204 such that the axial passage 214a faces toward the inlet fitting 208. The free sliding movement of the valve piston 212 is limited, in a first direction, by abutment to an end shoulder 216 of the valve body 202 at the end of the valve cylinder 204 adjacent the inlet fitting 208, and, in the opposite direction, by contact with, and biasing by, a valve spring 218 which is attached to the valve body and disposed in the valve chamber 206 adjacent the outlet fitting 210. The valve spring 218 biases the valve piston 212 to a spring neutral position, shown at FIG. 4, whereat the valve piston is disposed remote from the end shoulder 216, yet disposed such that the radial passage 214 is closed shut by the cylinder wall 204a at a location generally adjacent the valve chamber 206.

Operation of the metering check valve 200, 200' with respect to, by way of example, the active brake pads retraction system 100, 100' will now be detailed.

The ECU 102 constantly runs predetermined algorithms, including an active brake pad retraction algorithm, as for example the active brake pad retraction algorithm according to the GM Active Brake Pads Retraction System, while receiving vehicular behavior inputs to determine brake action commands. A brake apply situation is handled as generally shown and described with respect to FIG. 1A via a high pressure brake fluid at the caliper portion of the brake line.

The ECU 102 commands the normally open inlet valve 108 to be open, the normally closed outlet valve 110 to be closed and the brake fluid pump 106 to rapidly energize so as to provide a high pressure HP brake fluid in the hydraulic brake line 112, 112' and, via the metering check valve 200, 200', also in the caliper portion of the brake line 112a, 112a'. In this regard, the high pressure at the inlet port 108a applies a positive pressure against the piston 212, causing the piston to move (see arrow $A_P$) in the valve cylinder 204 toward and into the valve chamber 206, compressing the valve spring 218 sufficiently so that the radial passage 214b is open to the internal space 206a of the valve chamber, as shown at FIG. 5. As such, brake fluid BF is enabled to flow (see arrows $A_F$) freely through the internal passage from the inlet port and out the outlet port without any restriction of any kind. Accordingly, the brake fluid pressure generated in the caliper portion of the brake line results in displacement of the caliper pistons which moves the brake pads (at each brake corner) so as to thereby apply the brakes in the sense that the brake pads press hard against the rotor cheeks. The normally open inlet valve and normally closed outlet valve are such during normal braking, being selectively opened and closed by the ECU during an ABS event, as for example when slip at the wheels is occurring.

In a brake un-apply situation in which braking may be needed imminently, the situation is handled as generally shown and described with respect to FIG. 1B via a low pressure brake fluid at the caliper portion of the brake line. However, in a brake un-apply situation in which braking will not be needed, the ECU handles the situation differently from the scenario of FIG. 1B, as shown at FIGS. 2 and 3, via a negative pressure NP brake fluid at the caliper portion of the brake line according to an active brake pad retraction algorithm, as for example described in the GM Active brake Pads Retraction System. The active brake pads retraction operation proceeds as follows.

Upon command from the ECU 102 to execute active brake pads retraction, at each brake corner the normally open inlet valve 108 of the brake line 112, 112' is closed and the normally closed outlet valve 110 of the brake line is opened. These valve settings, at each brake corner, isolate the caliper portion 112a, 112a' of the brake line from the pressure side, and simultaneously expose it to the vacuum side, of the (at least one) brake fluid pump 106. The brake fluid pump is thereupon immediately energized, pushing the brake fluid in the brake line upstream of the brake fluid pump towards the master cylinder brake fluid reservoir 114, which is vented to atmosphere. The brake line (at each brake corner) downstream of the brake fluid pump is therefore exposed to a negative (i.e., below atmospheric) brake line pressure NP.

This negative brake line pressure NP with respect to atmospheric pressure applies a suction-retraction force to the valve piston 212 of the metering check valve 200, 200', thereby causing the valve piston to move (along arrow $A_F'$ toward the inlet port 208a (see FIG. 6), i.e., toward end shoulder 216, wherein the radial passages 214b are sealingly closed by the cylinder wall 204a due to the biasing of the valve piston to the neutral position by the valve spring 218. Simultaneously, hydraulic fluid from the caliper portion of the brake line is drawn (see arrow $A_F'$), via the outlet port 210a, into the valve chamber 206 and communicating valve cylinder 204 as the valve piston moves, until the valve piston abuts the end shoulder 216.

Figure 7A:
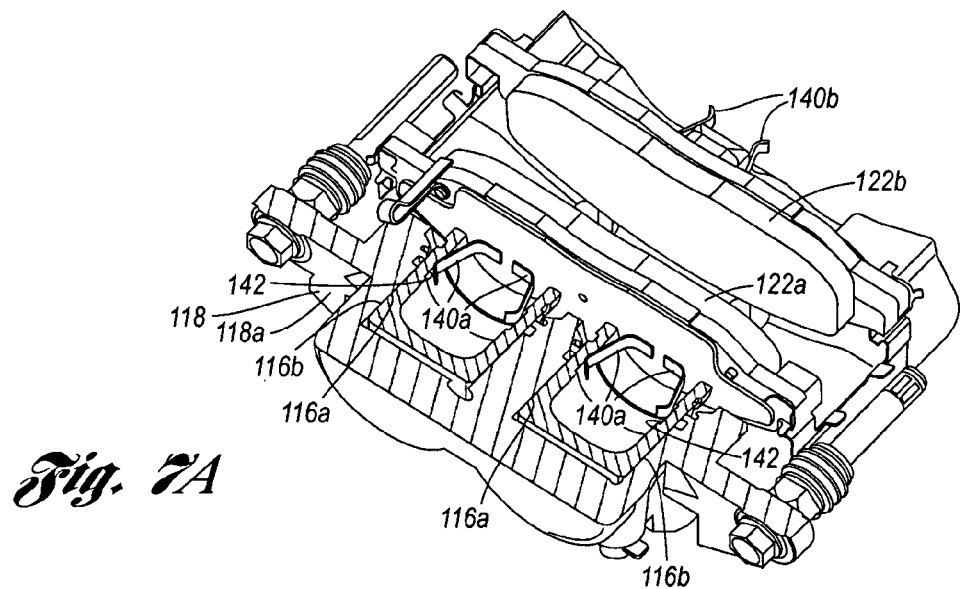
FIG. 7A is a partly sectional view of the brake caliper of FIG. 2, showing in particular a brake pad clips interface with the caliper pistons at the hydraulically active side of the brake caliper.
Figure 7B:
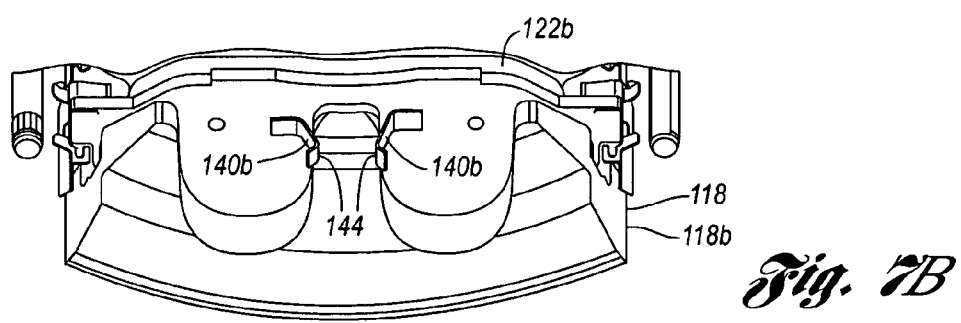
FIG. 7B is a partly sectional view of the brake caliper of FIG. 2, showing in particular a brake pad clips interface with the hydraulically inactive side of the brake caliper.

This pressure differential is registered at the caliper pistons 116b, 116b' (at each brake corner), which are caused to be pulled in the direction of the negative pressure to compensate for the displacement of brake fluid pumped into the master cylinder brake fluid reservoir on the pressure side of the brake fluid pump. This displacement of the caliper pistons moves the brake pads (at each brake corner), which are affixed to the caliper pistons, as for example via brake pad clips 140a, 140a', 140b as generally known in the art (i.e., see FIGS. 7A and 7B), away from the rotor cheek surfaces. The retraction movement of the brake pads is limited to the retraction volume (see phantom outline of the retraction volume V at FIG. 6) of hydraulic fluid displaced by the movement of valve piston in the valve body of the metering check valve. With respect to brake rotor 118 of FIG. 2, FIG. 7A shows that the brake pad clips 140a are each affixed to the active side of the brake pad 122a and resiliently clip onto an interior annular slot 142 of the caliper pistons 116b; and FIG. 7B shows that the brake pad clips 140b each are affixed to the inactive side of the brake pad 122b and resiliently clip onto an interior annular slot 144 of hydraulically inactive side 118b of the brake caliper.

In a brake system 100 utilizing a sliding brake caliper 118 (FIG. 2), since one side 118a of the caliper housing is hydraulically active and the other side is hydraulically inactive, the brake pad of the hydraulically active side tends to retract first until the brake caliper reacts to allow the hydraulically inactive side 118b and its brake pad to also retract. In a braking system 100' utilizing a fixed brake caliper 118' (FIG. 3), both sides 118a', 118b' of the caliper are hydraulically active and the caliper pistons retract independently of each other as both are directly affected by the negative pressure in the caliper portion of the brake line. With respect to active brake pad retraction, for either type of brake caliper 118, 118', brake pad retraction creates a gap between the brake pads and the brake rotor which is repeatably defined by the retraction volume V displaced by the movement of the valve piston 112. Accordingly parasitic brake drag and galvanic corrosion are reduced or even eliminated, yet the brake pads are kept optimally close to the brake rotors ready for the next brake application.

In the event sensed vehicle conditions no longer indicate that the brakes will not be required, the ECU, pursuant to the active brake pad retraction algorithm, thereupon sends commands to close the outlet valve, open the inlet valve and activate the brake fluid pump, whereupon a low positive pressure in the brake fluid is experienced at the caliper portion of the brake line (at each brake corner), whereby the brake pads move toward the brake rotors a minimum allowable extent without actual brake application, in anticipation of future brake application. The commands may include implementation of a pre-charging feature of the braking system.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A braking system of a motor vehicle, comprising:
an active brake pads refraction system comprising:
an hydraulic brake line having a pressurizable brake fluid therewithin;
at least one brake corner, each brake corner comprising:
a brake caliper connected to said brake line; and
a pair of brake pads connected with said brake caliper in oppositely disposed relation to each other; and
a metering check valve at each brake corner disposed between said hydraulic brake line and the brake caliper thereof, said metering check valve having a predetermined retraction volume therewithin, wherein brake fluid flows through said retraction volume in a first direction in response to brake pad application, and in a second direction, opposite to said first direction, in response to brake pad retraction;
wherein when said active brake pads retraction system pressurizes said brake fluid to a pressure below atmospheric pressure, then said brake caliper responsively retracts said brake pads away from each other; and
wherein the brake pads retraction is provided by brake fluid passing through said metering check valve in said second direction such that the retraction is limited by the retraction volume.

2. The braking system of claim 1, wherein said metering check valve comprises:
- a valve body comprising a valve cylinder; and
- a valve piston movable in said valve cylinder;
- wherein predetermined movement of said valve piston comprises said retraction volume.

3. The braking system of claim 2, wherein:
- said active brake pads retraction system further comprises:
  - at least one hydraulic brake fluid pump operatively connected to said brake line; and
  - wherein each brake corner further comprises:
    - a normally open inlet valve connected to said brake line; and
    - a normally closed outlet valve connected to said brake line;
  - wherein said brake fluid is pressurized below atmospheric pressure in response to said inlet valve being closed, said outlet valve being open, and said at least one brake fluid pump being actuated; and
- said metering check valve has an inlet port and an outlet port, wherein said inlet and outlet valves are connected to said inlet port, and said brake caliper is connected to said outlet port.

4. The braking system of claim 3, further comprising:
- a brake rotor disposed, respectively, at each said brake corner, wherein each said brake rotor comprises a pair of rotor cheeks disposed between said pair of brake pads at the respective brake corner;
- wherein at each brake corner, when said brake pads retract with respect to each other in said response to said brake line pressure being below atmospheric pressure, said brake pads retract a predetermined distance with respect to said rotor cheeks responsive to said retraction volume of said metering check valve.

5. The braking system of claim 4, wherein said metering check valve further comprises:
- said valve body further comprising a valve chamber fluidically communicating with said valve cylinder; and
- said valve piston having formed therein an internal passage, wherein the movement of said piston includes movement in which said passage is sealingly closed by said valve cylinder in which fluid is prevented from flowing therethrough between said inlet and outlet ports, and includes movement in which said passage is open to said valve chamber in which fluid is able to flow therethrough between said inlet and outlet ports;
- wherein said inlet port is connected to said valve cylinder and said outlet port is connected to said valve chamber.

6. The braking system of claim 5, wherein said metering check valve further comprises:
- a valve spring disposed in said valve chamber, said valve spring biasing said valve piston to a spring neutral position whereat said valve piston is disposed remote from said inlet port and said internal passage is sealingly closed by said valve cylinder.

7. The braking system of claim 6, wherein said metering check valve further comprises:
- an end shoulder adjacent said inlet port which provides an abutment stop for movement of said valve piston;
- wherein said refraction volume comprises a fluid displacement volume due to the movement of said valve piston from substantially said spring neutral position to abutment with said end shoulder.

8. In an active brake pads refraction system comprising an hydraulic brake line having a pressurizable brake fluid therewithin; at least one brake corner, each brake corner comprising a brake caliper connected to said hydraulic brake line by a brake line caliper portion, and a pair of brake pads connected with said brake caliper in oppositely disposed relation to each other; the improvement thereto comprising a metering check valve for an active brake pads retraction system, comprising:
- a valve body comprising a valve cylinder and a valve chamber fluidically communicating with said valve cylinder;
- an inlet port connected with said valve cylinder, said inlet port being adapted for connection to said hydraulic brake line;
- an outlet port connected with said valve chamber, said outlet port being adapted for connection to said brake line caliper portion;
- a valve piston movably disposed in said valve cylinder, wherein said valve piston has formed therein an internal passage, wherein the movement of said piston includes movement in which said passage is sealingly closed by said valve cylinder in which fluid is prevented from flowing therethrough between said inlet and outlet ports, and includes movement in which said passage is open to said valve chamber in which fluid is able to flow therethrough between said inlet and outlet ports; and
- a valve spring disposed in said valve chamber, said valve spring biasing said valve piston to a spring neutral position whereat said valve piston is disposed remote from said inlet port and said internal passage is sealingly closed by said valve cylinder;
- wherein the movement of the valve piston includes a predetermined retraction volume therewithin;
- wherein when said hydraulic brake line is pressurized below atmospheric pressure, said brake caliper responsively retracts said brake pads away from each other; and
- wherein the retraction is limited by the retraction volume.

9. The metering check valve of claim 8, further comprising:
- an end shoulder adjacent said inlet port which provides an abutment stop for movement of said valve piston;
- wherein said refraction volume comprises a fluid displacement volume due to the movement of said valve piston from substantially said spring neutral position to abutment with said end shoulder.

10. A method for retracting brake pads at each brake corner of a motor vehicle, comprising the steps of:
- determining predetermined conditions of the motor vehicle, wherein the predetermined conditions comprise a determination whether the brakes are applied and whether braking is not required;
- applying negative pressure with respect to atmospheric pressure to a brake line of the motor vehicle if said step of determining determines that the brakes are not applied and braking is not required;
- establishing a retraction volume in a metering check valve in response to said step of applying negative pressure; and
- retracting the brake pads in response to said step of applying negative pressure;
- wherein the retracting is limited responsive to the established retraction volume.

11. The method of claim 10, further comprising the step of:
- applying positive pressure to the brake line of the motor vehicle if said step of determining determines that the brakes are applied, wherein the positive pressure passes freely through the metering check valve to cause the brake pads to press against the brake rotor at each brake corner.

* * * * *